S. Knight,
Cage Trap,
Nº 51,463.　　　　　　Patented Dec. 12, 1865.
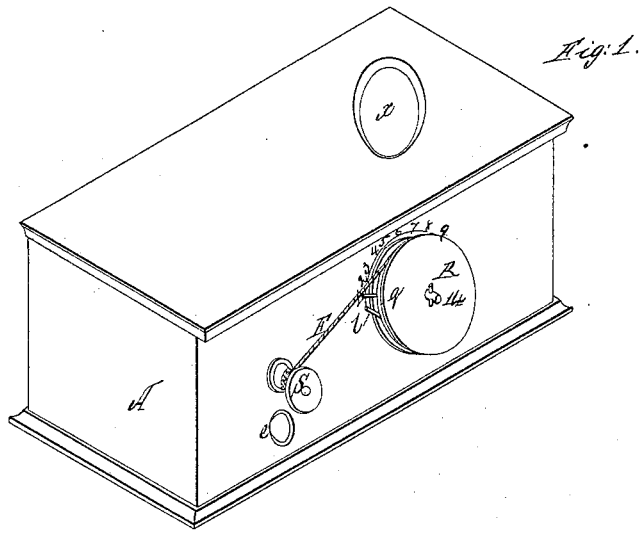
Witnesses:
William Hoffstot
J. E. Fleischman
Inventor:
Sylvanus Knight

UNITED STATES PATENT OFFICE.

SYLVANUS KNIGHT, OF ADEL, IOWA.

IMPROVEMENT IN ANIMAL-TRAPS.

Specification forming part of Letters Patent No. 51,463, dated December 12, 1865.

*To all whom it may concern:*

Be it known that I, SYLVANUS KNIGHT, of Adel, in the county of Dallas and State of Iowa, have invented a new and useful Trap; and I do hereby declare that the following is a full and exact description thereof, reference being had to the accompanying drawings, and to the letters of reference marked thereon.

The nature of my invention consists in an arrangement of a spring and wheel, said wheel being operated by a spring, drums, and cord, the whole being constructed, arranged, and operating in the manner hereinafter described.

In the accompanying drawings, Figure 1 is a perspective view (in outline) of my improved trap used for trapping animals. Fig. 2 represents a longitudinal section of the same.

In the drawings, A represents the case. On the inside of the sides of this case are grooves, as indicated at 13. In these grooves are placed tin or sheet-iron pieces, marked B, C, and o. To the piece B is hinged a tread, D, which is held up to its place by the spring marked t. Central to the pieces B and C is placed the axle n, which is armed with wings, y. On the end of the axle n is placed a drum or pulley, S. (See Fig. 1.) To this drum or pulley S is attached a cord or small chain, F, which is also attached to the drum or pulley R, which revolves on the axle 14. The drum or pulley R is turned out on the inside for the purpose of forming a chamber for a coil spring, which is attached at one end to the axle 14, and the other end of which is attached to the side of the chamber made in the drum or pulley. The spring in the drum or pulley R is arranged and works similar to the mainspring of a watch, the arrangement and working of which is well understood. On the side of the drum or pulley R is a pin or stop, q, and on the side of the case A is another pin or stop, l, and around the upper side of the drum or pulley R, on the side of the case A, is placed an index, indicated by the figures 1, 2, 3, 4, 5, 6, 7, 8, and 9.

To the piece o is hinged a drop-door, which consists of strips, common in the construction of drop-doors for traps. This open-work door m is used for the purpose of admitting light through it, which light is admitted into chamber L through glass x placed in the top of the trap or case A.

In the end of case A is a door, p, which is hinged at the point marked 11. This door leads into chamber L.

In the bottom of the case A, under the tread D, is an opening marked 12. This opening will allow the tread D to be pressed down sufficiently for the trigger i to become unshipped from the wing y which is in contact with it.

In order that the nature and construction of my improved trap may be more clearly understood, I will now proceed to describe its operation.

When I desire to set the trap I turn the drum or pulley S, so that the wings y of the wheel will turn in the direction indicated by the arrow marked 16. The wings will readily (by pressing on the inclined side) pass over the trigger i, and thus allow the cord or chain F to be run off the drum R on the drum or pulley S, until the pin q comes in contact with the pin l. Now, when a mouse, rat, or other animal enters the trap through the opening e and comes on the tread D, the weight of the animal will press down the tread D, which will lower the trigger i, which allows the wing which it was holding back to be drawn forward in the direction indicated by the arrow marked 17. This will throw the animal from off tread D into the chamber B'. This will frighten and alarm the animal, and in its surprise and terror will rush forward to the light which comes through the open-worked door m, and raising the door will find itself completely entrapped in chamber L.

It will readily be observed that the size of trap and the strength of the spring in the drum R must be in proportion to the purpose for which it is used—that is to say, the trap and its various parts must be in proportion to the size of the animal to be entrapped. And it will also be observed that by the use of index 1, 2, 3, 4, 5, 6, 7, 8, 9, &c., which is on the side of case A, the number of animals entrapped can readily be ascertained without an examination into the trap, for as each animal is entrapped the pin q will point to the proper number in the index. And it will be further observed that my improved trap may be constructed of wood, tin, or sheet-iron, or it may be constructed of these things combined; hence I do not confine myself to the use of any one of them, or to the use of any other material, nor do I confine myself to any particular size or form of the various parts constituting my trap. Provided, however, that in all cases the arrangement herein described and represented must be substantially the same, operating in the manner described and for the purpose set forth.

I wish it to be clearly understood that I do not claim, broadly, the use of the wheel consisting of the axle $n$ and wings $y$, when used in connection with traps, for such device is now in common use in connection with traps; but What I do claim as of my invention, and desire to secure by Letters Patent of the United States, is—

The arrangement of the case A, furnished with the openings $e$ and 12, door $p$, glass $x$, and grooves 13, pieces B, C, and $o$, door $m$, tread D, trigger $i$, spring $t$, drums R and S, cord or chain F, pins $l$ and $q$, and index 1, 2, 3, 4, 5, 6, 7, 8, 9, &c., when used in connection with the wheel consisting of axle $n$ and wings $y$, the whole being constructed, arranged, and operating substantially as herein described, and for the purpose set forth.

SYLVANUS KNIGHT.

Witnesses:
WILLIAM HOFFSTOT,
J. E. FLEISCHMAN.